July 16, 1929.　　　K. KNUDSEN　　　1,720,906
WINDSHIELD WIPER
Filed May 27, 1926　　　2 Sheets-Sheet 1

Inventor:
Karsten Knudsen
By Brown, Boettcher, Dienner
Attys

July 16, 1929. K. KNUDSEN 1,720,906
WINDSHIELD WIPER
Filed May 27, 1926  2 Sheets-Sheet 2

Inventor:
Karsten Knudsen.
By Brown, Boettcher, Dienner Attys

Patented July 16, 1929.

1,720,906

UNITED STATES PATENT OFFICE.

KARSTEN KNUDSEN, OF CHICAGO, ILLINOIS, ASSIGNOR TO STROMBERG RESEARCH CORPORATION, A CORPORATION OF ILLINOIS.

WINDSHIELD WIPER.

Application filed May 27, 1926. Serial No. 111,931.

My invention relates to electric wind shield wipers particularly to that type in which an electric motor produces the driving power. The important object of the invention is to translate the circular uniform movement of a crank pin driven by the motor into oscillatory swing of the wiper bar at practically uniform speed and torque and with uniform load on the motor. The invention also involves other features of construction, arrangement and operation all of which are fully disclosed in the following specification in connection with the drawings, on which drawings.

Figure 1:
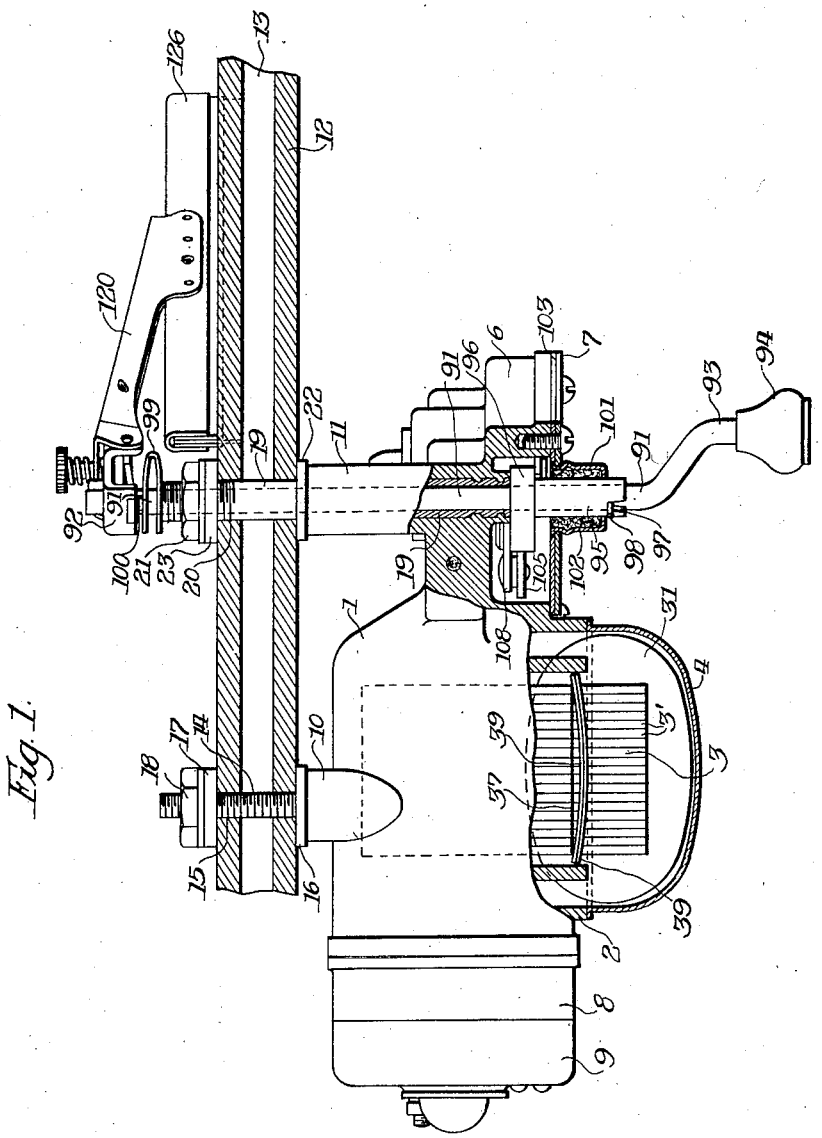
Figure 1 is a plan view, with parts in section, showing a wiper structure applied to a wind shield.

Briefly describing the wiper structure to which I have shown my invention applied, the housing structure for the wiper operating parts comprises the main section 1 which is cylindrical and has the radial rectangular extension 2 which together with the main section forms an enclosure and support for the field frame or element 3 of the electric propulsion motor. The extension 2 has the detachable cap or cover 4 held in place by screws 5.

The main section 1 of the housing has also the extension 6 forming an enclosure for the gearing and translating linkage between the electric motor and wiper arm, the housing structure 6 having the detachable cover 7. The housing structure comprises further the end cap 8 and a switch lever supporting cover 9.

Extending rearwardly from the main housing part 1 and the gear housing section 6 are the lugs 10 and 11, respectively, for seating the structure against the frame 12 of a wind shield glass 13. The lug 10 has the threaded post 14 extending therefrom and which engages through the opening 15 through the wind shield frame, rubber or other resilient washers 16 and 17 being interposed between the wind shield frame and the lug 10 and the nut 18 receiving the threaded post.

The lug 11 has the bushing tube 19 extending therethrough, the tube at its front end terminating within the gear housing 6 while the rear end of the tube is threaded and projects through the hole 20 through the wind shield frame to be engaged by a nut 21. Rubber or other resilient washers 22 and 23 are interposed to engage the wind shield frame.

Describing now briefly the motor structure, the armature shaft 24 extends axially through the main housing part 1. At its right end the shaft is journaled in the wall 25 between the main housing and the gear housing 6, the shaft at its outer end extending into the end cap 8 where it has side bearing in the bushing 26 and thrust bearing against the ball 27. The field frame 3 is constructed of laminations 3′, the inner faces of the poles receiving between them the armature 30. The yoke of the field frame supports the spool 31 on which are wound the inner and outer field windings, respectively.

The outer surfaces of the field poles are concentric with the housing section 1, the field frame having its axial displacement limited by the ribs 35 and 36 formed in the extension housing 2. The field frame has the side ledges 37 and 38 a distance below the outer edge of the housing 2, and seated on said ledges and between the abutment ribs 35 and 36 are the arcuate springs 39 of one or more layers, the springs being arranged with their contact sides outwardly to be abutted against by the cover 4 when it is secured to the housing part 2 by the screws 5, the pressure of the cover against the springs causing the ends of the springs to press against the end edges of the ledges 37 and 38 so that the springs will tend to keep the field frame anchored midway between the abutment ribs 35 and 36, as best shown in Figure 1. The field frame will thus be securely held in proper position within the housing structure to cooperate properly with the armature. The commutator 42 mounted on the armature shaft is engaged by the brushes 43 and 44 mounted on suitable brush holders 45 and 46.

The right end of the armature shaft 24 extends into the gear housing 6 and is cut to form a gear worm 83 which meshes with a worm gear 84 journaled on the post 85 secured to the bottom of the gear housing by means of a nut 86. The armature shaft abuts against an L bracket 87 adjustably secured by means of a screw 88 which is slidable in the slot 89 formed in the bottom wall of the gear housing. By adjusting this abutment bracket against the right end of the armature shaft, the left end of the shaft will be kept in proper engagement with the thrust bearing ball 27 and the desired end play of the shaft can be readily adjusted for.

The worm gear 84 is below the worm 83 and has a crank pin 90 extending therefrom. Above the worm 83 is the bushing 19 hereinbefore referred to, this bushing forming a bearing for the operating rod 91 which, at its outer end, has secured thereto the wiper arm supporting fitting 92 and which, at its inner end, is bent to form a lever 93 terminating in a knob 94 by means of which the rod 91 may be readily oscillated manually to swing the wiper arm back and forth.

Seating against the inner end of the lug 11 and receiving the rod 91 is a sleeve or hub 95 to which is secured the crank arm 96, this crank arm being connected with the crank pin 90 through a cam link 105 to be presently described. In the end of the sleeve 95 are the notches 97 for receiving a pin 98 on the rod 91, the engagement of the pin in the notches causing the rod to be secured to the sleeve and to the crank arm 96 so that the wiper mechanism will be operated by the motor. A U-shaped spring 99 receives the outer end of the rod and abuts against the end of the bushing 19 and a cotter pin 100 extending through the rod, the tendency of the spring being to pull the rod to hold its pin within the slot 97 and to thus couple the rod for power drive by the motor. Upon an outward pull on the rod a sufficient distance to release the pin from the slot the rod can be turned manually to operate the wiper independently of the motor.

The cover 7 for the gear case or housing 6 has a bearing lug 101 for receiving the hub 95 of the crank arm 96, the lug being filled with packing material 102 such as felt in order to prevent leakage of lubricating material put into the gear housing for the operating parts therein. A gasket 103 is also provided for the cover 7 to serve as a seal against escape of lubricant.

The cam link 105 is in the form of an L shaped metal plate, its vertical arm being pivoted at its end by pin 106 to the end of the crank arm 96, while in the horizontal arm of the link is the cam slot 107 which receives the crank pin 90. A guide link 108 is pivoted at its outer end to the corner of the cam link and at its inner end is pivoted on a post 109 by the pin 110. This link guides the vertical bodily movement of the cam link. A retainer plate 111 is secured on post 112 by a screw 113. The upper end of this plate overlies the crank arm 96 and holds it in proper position on the rod 91. The lower end of the retainer plate engages against the conical end of the pivot pin 110 and holds this pin with its head against the guide link 108 to hold said link accurately in operative position.

The radius of revolution of the pin 106 is longer than that of the crank pin 90 and if these pins were connected together by the ordinary straight link the uniform rotary motion of the crank wheel 84 would be translated into harmonic oscillatory movement of the crank arm 96 and the rod 91. The purpose, however, is to have the wiper arm swing with uniform motion sufficiently retarded or rounded off at the ends of the strokes to prevent abrupt reversals, and this is accomplished by the cam link 105 which, by means of the crank pin and the guide link 108, is moved bodily and which also has rotational movement on its pivot connection with the guide link. The cam slot 107 is formed to produce the desired proportional rotation and bodily movement of the cam link 105. The slot is of a width to permit easy travel therethrough of the crank pin and for engagement of the crank pin with either the upper or lower surfaces of the slot. The slot shown has the slightly upwardly inclined longer section 114 and the slightly upwardly inclined shorter section 115, the surfaces at the juncture of these sections being slightly rounded to permit easy travel therethrough of the crank pin.

Figure 2:
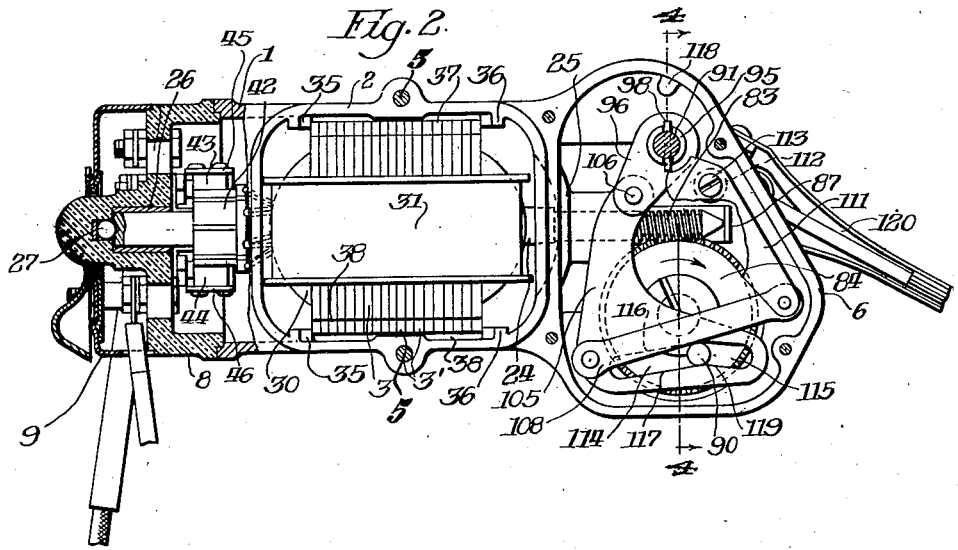
Figure 2 is a front elevational view with the enclosure covers removed and with the left end of the structure in vertical diametral section.

In Figure 2 the crank arm 96 is shown at the lower end of its swing, the crank wheel 84 rotating in clockwise direction. The crank pin has just finished its travel through the section 115 of the cam slot and is about to engage with the upper surface 116 of the slot section 114. During such engagement the cam link will be rotated in counterclockwise direction to start the crank arm 96 on its upward swing with uniform motion, the rotation of the cam link being gradually reduced and the bodily movement being gradually increased as the crank pin radius comes into coincidence with the radial line of the guide link 108. During such travel of the guide link and crank pin through the horizontal radial line the movement of the cam link is practically all bodily, the proportion between bodily and rotational movement being, as before explained, such that the crank arm 96 will be given a uniform motion.

Figure 3:
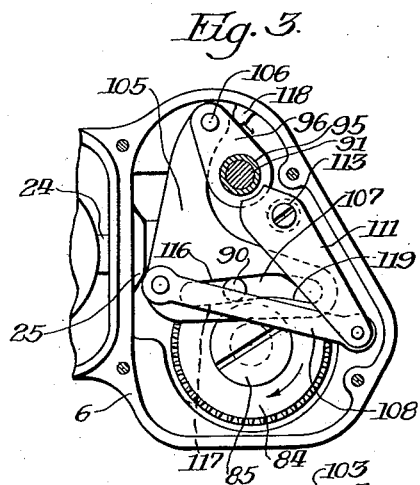
Figure 3 is a front elevational view of the gear housing with the cover removed.
Figure 4:
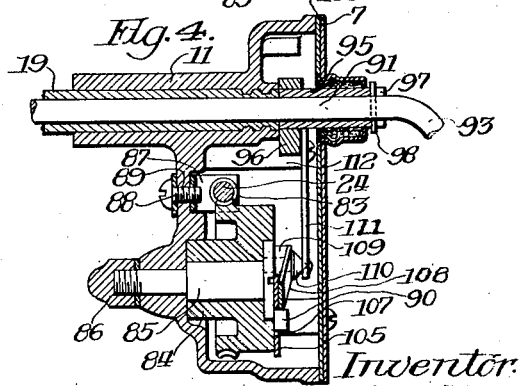
Figure 4 is a sectional view on plane 4—4 Fig. 2.

Now, as the crank pin travels toward the upper part of its orbit the bodily movement of the cam link gradually decreases and rotational movement in clockwise direction increases as the crank pin engages against the lower surface 117 of the cam slot section 114, such rotational movement increasing sufficiently rapidly to cause the crank arm 96 to continue in uniform motion, and the crank arm finally reaches the upper end of its swing, as shown in Figure 3. The crank arm 96 engages with the stop 118 and then for a short period the crank pin travels idly in the cam slot and gradually re-engages with the lower surface 117 and tends to swing the cam link clockwise, but such rotation is prevented by the stop 118 and therefore the pressure of the crank pin against the cam link will cause the link to move bodily downwardly. As the crank pin is a considerable distance from the pivot connection of the cam link with the guide link 108 the downward bodily movement of the cam link will be of such rate as will give to the crank arm 96 the desired uniform motion. As the crank pin now approaches its horizontal radius of revolution, it will enter the slot section 115 whose inclination will balance the otherwise accelerated movement of the cam link, and the uniform motion of the crank arm 96 will be maintained. During travel of the crank pin through the horizontal radius of revolution the bodily movement of the cam link predominates but gradually decreases, and as the crank pin reaches the lower section of its revolution it engages with the inclined lower surface 119 of the slot section 115, and rotary motion of the cam link will accelerate to compensate for the retarding bodily movement and the uniform motion of the crank arm 96 is maintained. The crank arm 96 will now be at the lower end of its swinging movement as shown in Figure 2, and while the crank pin is traveling through the juncture of the cam slot sections and just before it engages with the upper surface 116, the movement of the cam link is very slow, but it becomes normal as the crank pin engages with the surface 116 to start the upward swing of the crank arm. Thus, by the interposition of the cam link with its cam slot, and the guide link which guides the bodily and rotational movement of the cam link, the uniform circular travel of the crank pin is translated into swing of the crank arm 96 and wiper arm with uniform motion and with gradual but comparatively prompt reversals at the stroke ends. The wiper arm is also moved with practically uniform torque so that the load on the motor is practically uniform and without material current fluctuation.

A wiper arm structure 120 of suitable construction is pivoted to the supporting frame 92 already referred to, and carries a wiper blade 126.

In the arrangement shown the wiper arm is secured to extend from the driving rod 91 at right angles to the crank arm 96 and is wiped back and forth across the face of the wind shield with uniform motion and torque when the motor is connected with the driving rod. The motor will be in driving connection with the wiper arm when the driving rod pin 98 is in the slot 97 of the crank arm hub 95, the spring 99 tending to maintain such engagement. At times it may be desirable or necessary to operate the wiper manually and for this purpose the emergency crank 93 is provided on the driving rod 91. By first pulling on the crank sufficiently to disconnect the pin 98 from the slot 97, the rod can then be readily turned by means of the crank and the wiper arm swung manually. Then when it is released and the pin brought back into the slot the motor will be connected to drive the wiper mechanism. Release of the pin from the slot will permit the driving rod to be operated entirely independently of the crank arm 96 and the linkage and driving parts within the gear case 6.

Having thus described my invention, I claim as follows:

1. The combination of a driving motor, a crank wheel having a crank pin, said motor being connected to rotate said crank wheel to give said crank pin uniform motion through a circular path, a driving shaft, a crank arm on said driving shaft, a connecting cam link connected with said crank arm and having extended cam engagement with said crank pin, and guide means cooperating with said cam link to translate the uniform circular travel of said crank pin into swinging movement of said crank arm with substantially uniform motion.

2. The combination of a crank wheel having a crank pin, means for driving said crank wheel at uniform rate whereby said crank pin will travel with uniform speed through a circular orbit, a driving shaft, a crank arm on said shaft, a cam link connected to the end of said crank arm, said link at its other end having a cam slot receiving said crank pin, and means for guiding the bodily movement of said cam link, said cam link and guiding means causing the revolving movement of said crank pin to be translated into swinging movement of said crank arm at substantially uniform speed.

3. The combination of a driving shaft, a crank arm on said shaft, a crank wheel having a crank pin, means for driving said crank wheel at uniform speed whereby said crank pin will be given a revolving movement through a circular path at uniform speed, an L-shaped cam link pivoted at its upper end to said crank arm and having a cam slot in its base for receiving the crank pin, a guide member for guiding the bodily movement of said cam link, said guiding member and link cooperating to translate the revolving travel of said crank pin into swinging movement of said crank arm at substantially uniform speed.

4. The combination of a crank wheel having a crank pin, means for rotating said crank wheel at uniform speed to give said crank pin a circular orbit of travel, an operating shaft, a crank arm on said shaft, a connecting link supported for bodily and rotational movement, one end of said link being connected with said crank arm and its other end having camming cooperation with said crank pin, said connecting link translating the uniform travel of said crank pin into swing of said crank arm and driving shaft at uniform speed.

5. The combination of a crank wheel having a crank pin, means for rotating said crank wheel at uniform speed to give said crank pin a circular orbit of travel, an operating shaft, a crank arm on said shaft, a connecting link, a guide link pivoted to said connecting link intermediate its ends, one end of said connecting link being connected with said crank arm, the other end of said connecting link having a cam slot receiving said cam pin, said pin and cam slot connection causing the rotary travel of said crank pin to be translated into swing of said crank arm at substantially uniform speed throughout the major portion of its stroke and retarded movement at the ends of the strokes for preventing abrupt reversals.

6. The combination of a crank wheel having a crank pin, means for rotating said crank wheel at uniform speed, a driving shaft, a crank arm on said shaft, a connecting link connected at one end with said crank arm and having cam surfaces at its other end, said crank pin cooperating with said cam surfaces to cause bodily and rotational movement of said connecting link, and a pivot support for the rotational movement of said connecting link adapted to follow the bodily movement of said link, the combined bodily and rotational movement of said connecting link translating the revolution of said crank pin into oscillation of said crank arm at substantially uniform speed.

7. The combination of a crank wheel having a crank pin, means for rotating said crank wheel at uniform speed, an operating shaft, a crank arm on said shaft, a connecting link connected at one end with said crank arm, the other end of said connecting link having a cam slot extending transversely relative to a line connecting the axes of said crank wheel and crank arm, said crank pin engaging in said cam slot and cooperating therewith to cause bodily and rotational movement of said connecting link, a pivot support for said connecting link intermediate its ends for guiding the rotational movement thereof, said pivot support being shiftable to follow the bodily movement of said link, the combined bodily and rotational movement of said link translating the revolution of said crank pin into swing of said crank arm at substantially uniform speed.

In witness whereof, I hereunto subscribe my name this 24th day of May, 1926.

KARSTEN KNUDSEN.